US010883734B2

United States Patent
Schmidt et al.

(10) Patent No.: US 10,883,734 B2
(45) Date of Patent: Jan. 5, 2021

(54) MOISTURE REGULATING ELEMENT FOR USE IN PACKAGING

(71) Applicants: Andreas Schmidt, Duderstadt (DE); Filip Tintchev, Duderstadt (DE)

(72) Inventors: Andreas Schmidt, Duderstadt (DE); Filip Tintchev, Duderstadt (DE)

(73) Assignee: MCAIRLAID'S VLIESSTOFFE GMBH, Berlingerode (DE)

( * ) Notice: Subject to any disclaimer, the term of this patent is extended or adjusted under 35 U.S.C. 154(b) by 0 days.

(21) Appl. No.: 15/497,772

(22) Filed: Apr. 26, 2017

(65) Prior Publication Data

US 2017/0356662 A1    Dec. 14, 2017

Related U.S. Application Data

(63) Continuation of application No. 13/724,471, filed on Dec. 21, 2012.

(30) Foreign Application Priority Data

Jan. 2, 2012  (DE) .................... 20 2012 100 002 U

(51) Int. Cl.
| | | |
|---|---|---|
| *F24F 6/00* | (2006.01) | |
| *B01D 53/28* | (2006.01) | |
| *B65D 81/26* | (2006.01) | |
| *B01D 53/26* | (2006.01) | |

(52) U.S. Cl.
CPC ................ *F24F 6/00* (2013.01); *B01D 53/28* (2013.01); *B65D 81/264* (2013.01); *B01D 53/261* (2013.01)

(58) Field of Classification Search
CPC .. B65D 81/264; B65D 81/265; B65D 81/266; B65D 81/267; B65D 81/268; F26B 21/083
USPC ............................................. 206/204; 34/416
See application file for complete search history.

(56) References Cited

U.S. PATENT DOCUMENTS

| | | | | |
|---|---|---|---|---|
| 1,812,970 A | * | 7/1931 | Mason ...................... | D21J 1/00 162/101 |
| 4,977,031 A | * | 12/1990 | Temple ................ | B65D 81/264 428/463 |
| 5,022,945 A | * | 6/1991 | Rhodes ..................... | B32B 5/32 156/253 |
| 6,376,034 B1 | * | 4/2002 | Brander ............... | B65D 81/264 252/194 |
| 2004/0137116 A1 | * | 7/2004 | Saito ........................ | A23B 4/03 426/106 |
| 2005/0008737 A1 | * | 1/2005 | Kwon .................. | B65D 81/264 426/124 |

FOREIGN PATENT DOCUMENTS

DE   20 2009 005 971   *  8/2009 ............. B65D 81/26

* cited by examiner

*Primary Examiner* — David J Laux
(74) *Attorney, Agent, or Firm* — Rhodes IP PLC; Christopher Rhodes

(57) ABSTRACT

A moisture-regulating element for use in packaging is claimed, which comprises a layer of pulp fibres and optionally further layers, characterized in that the element contains means which are able to regulate the moisture content.
The moisture-regulating element may be used in packaging for the transport and other storage of moisture-sensitive products or can serve as such, in order to store these products under optimal moisture conditions.

5 Claims, 1 Drawing Sheet

MOISTURE REGULATING ELEMENT FOR USE IN PACKAGING

This application claims priority to German patent application No. 202012100002.4 filed on Jan. 2, 2012, the entire disclosure of which is hereby incorporated herein by reference.

The present invention relates to a moisture-regulating element for use in packaging, which comprises a layer of pulp fibres and optionally further layers.

Storing foodstuffs under optimal conditions means that parameters such as the ambient temperature and the relative atmospheric humidity must be controlled or influenced appropriately. The increase in the relative atmospheric humidity in an area, which can have a detrimental effect on the quality of the food, is caused by many parameters, such as temperature fluctuations, sweating of the products (also designated breathing), moisture which is given off by the product itself, (bio)chemical reactions within the product. In order to optimize the conditions under which the goods are stored, the foodstuffs are packaged in accordance with their type and consistency. In this respect, it is primarily necessary to take into account the fact that, when relatively large quantities of moisture occur, i. e. the relative atmospheric humidity exceeds values of 80%, growth of the microorganisms such as mould is greatly promoted.

Many foodstuffs are packaged in order to protect them against external influences, in particular including against atmospheric oxygen and against drying out and to ensure better quality and also a longer shelf life. The condensation that forms is usually easily visible in the packaging and therefore has a detrimental effect on the visual impression of the product. In addition, a relatively high atmospheric humidity constitutes a good environment for the growth of microorganisms.

The optimal conditions of temperature and atmospheric humidity are of great importance, not only for foodstuffs which are packaged in domestic quantities that are intended for private consumption, but also when storing the products at the producer, during transport and in trade. There are a large number of other products which need constant contents of atmospheric humidity, such as many electronic devices, clothing, etc.

DE 40 00 143 discloses packaging or a container for foodstuffs and luxury items, e. g. for tobacco products, which contains a nonwoven for moisture control. This nonwoven, as a storage nonwoven, is intended to have a high water absorption capacity, it is enclosed by a material layer that is largely impermeable to water vapour and is connected to the packaging atmosphere by a second nonwoven, which is intended to compensate for the moisture losses from the packaging atmosphere and has a predefined equilibrium moisture content.

DE 20 2009 005 971 discloses an absorbent mat built up in several layers as an inlay for foodstuff packaging, which has a liquid-impermeable base layer, a layer of an absorbent material and a covering layer that is permeable to liquids, the base layer and the covering layer permeable to liquids projecting beyond the layer of absorbent material on at least two sides. The layer of an absorbent material is built up substantially from pulp fibres.

When storing foodstuffs, but also other moisture-sensitive products, on the one hand it is desirable that the foodstuff or product is stored in an environment which has a certain humidity in order to prevent drying out. On the other hand, it is intended to avoid the relative atmospheric humidity, which not only forms a good basis for the growth of mould and microorganisms but also impairs the quality of the foodstuff or product, becoming too high.

The present invention was based on the object of providing a material which can be used in packaging for the transport and other storage of moisture-sensitive products or can serve as such, in order to store these products under optimal moisture conditions.

This material should be configured such that it is suitable for a large number of products and different packaging forms and can be matched to these.

The subject of the present invention is accordingly a moisture-regulating element for use in packaging, which comprises a layer of pulp fibres and optionally further layers, characterized in that the element contains means which are able to regulate the moisture content.

The moisture-regulating element according to the invention has the advantage that it essentially consists of materials that are simple to obtain and are inexpensive. The pulp fibres are a material that can be obtained inexpensively, which is available in large quantities and, furthermore, can easily be processed. Furthermore, as a natural material, it is not only environmentally friendly but is also compatible with most foodstuffs and other products to be protected against moisture.

According to the invention, the moisture-regulating element contains means which are able to regulate the moisture content of the air. These means are substances (materials or material mixtures) which, upon contact with air, are intrinsically capable of drawing moisture from the air or giving up moisture thereto. The moisture can be adsorbed (hydration) or given up (dewatering). In the case of moisture adsorption, for example on a salt, as a result of the contact of moisture with the salt, a saturated solution is formed; the means used dissolves slowly but remains between the pulp fibres. On the other hand, the means used can also give up the bound water again when the moisture content becomes too low (in relation to the capability of the means used to bind water); in this case moisture is given up to the air, i. e. the means is dewatered. A balance between the means and the surrounding is achieved.

In one possible refinement, the substances can also be used in the form of solutions which, when they pick up $H_2O$ from the air, solidify or form a gel. The humidity is removed from the balance between surrounding and means. With the aid of such materials, the environment can be reduced to a relative atmospheric humidity of the environment down to virtually 0%, depending on the choice of these materials.

Examples of such moisture-regulating means are inorganic salts, sugar, starches or modified starch products, alkali and alkaline earth metal salts of alcohols, silicates, polymers, such as gel-forming polymers including superabsorbent polymers, and mixtures of the above. These means can be chosen in accordance with the intended use and absorption capacity in relation to water and moisture. The suitable inorganic salts include, for example, sodium chloride, potassium chloride, zinc chloride, sodium carbonate, potassium carbonate, sodium sulphate, potassium sulphate, sodium nitrate, potassium nitrate, sodium hydroxide, potassium hydroxide, calcium chloride, calcium oxide and any desired mixtures of the above. The sugars include, for example, fructose, glucose and saccharose. As alcohols, which can be converted into the corresponding alcoholates, glycerine and glycol should be mentioned. The suitable silicates include silicon gel and bentonite. It is also possible to use mixtures of different materials. The choice of these substances is made on the basis of the atmospheric humidity to be established and the product to be stored.

The moisture-regulating means are usually used in the form of solids, preferably in particulate form. The means may be spread on the lay of pulp fibres. In a preferred embodiment the moisture-regulating means are incorporated into the layer in form of particulate or granular material. In this embodiment the means are distributed layerwise statically. The means may be incorporated during the process of preparing the layer of pulp fibres.

The moisture-regulating element according to the invention is preferably a flat element. This can be cut to the desired size and inserted into a packaging or can be part of this packaging. The layer of pulp fibres has the advantage that these can firstly, so to speak, act as a carrier material for the moisture-adsorbing means, secondly a layer of pulp likewise exhibits adsorbent properties, i.e. as soon as the adsorption capacity of the moisture-binding means become exhausted, i.e. when the moisture-binding means dissolves slowly as a result of the moisture, this solution formed can be picked up by the pulp fibres, so that the product to be protected and packaged does not come into contact with the moisture.

The layer of pulp fibres is preferably present in the form of nonwoven-type or fabric-type material. The pulp fibres have the advantage that these are materials that are inexpensive and available on the market and are simple to process. Air-laid nonwovens or tissue papers have proven to be particularly suitable as adsorption layers. In a preferred embodiment, the absorption layer of pulp fibres is an air-laid. In a particularly preferred refinement, the pulp layer has embossed areas distributed over its surface, in which the fibres are pressed against one another more intensely than in the other areas and, as a result, are connected in an adhesive-free and/or binder-free manner. Preferably in this embodiment, the absorbent core is produced from a fibrous web made of pulp fibres which, while the embossed areas in the pressure area are being produced, are calendered and connected in a point or line form and in a binder-free manner. The production of such materials is described, for example, in European Patent 1 032 342. The fibre layer of the layer of pulp fibres in this refinement is structured such that the pulp fibres outside these discrete embossed areas are present loosely one above another or adhering only weakly to one another, whereas in the embossed areas they are pressed against one another and enter into an intimate connection with the respectively adjacent pulp fibres. As a result of this refinement, complete omission of adhesives and binders for forming the pulp fibre composite is possible, which permits simple and complete recycling. In the embossed areas, the fibres do not merely adhere to one another. Instead, as a result of the application of pressure, adjacent pulp fibres in these embossed areas are firmly connected to one another. This connection is even able to withstand the action of moisture, so that the absorption layer used in accordance with the invention is distinguished by a mechanical load-bearing ability even in the wet state. The areas outside the discrete embossed areas, in which the fibres are present loosely one above another or adhering only weakly to one another, are distinguished by a good absorption capacity. The means for binding moisture are also preferably present in these areas. These can be distributed within the individual pulp fibres and, in the areas outside the discrete embossed regions, on account of the looser composite of the pulp fibres, they are in good contact with the environment, in particular with the moisture. If relatively large quantities of moisture or liquid are present, then these are picked up by the looser composite of pulp fibres, distributed over the entire area of the absorption layer and held there.

In a possible embodiment a further layer of nonwoven, tissue or any other thin material is applied above and/or under the layer of pulp fibres. This further layer may prevent that the product to be packaged does not come into contact with the moisture-regulating means.

A further subject of the present invention is the use of the element described above as an inlay in packaging or as part of packaging of solid or liquid foodstuffs, medicines, chemical substances, dangerous materials, electronic products, cultural objects and decorative plants.

The element according to the invention will be explained in more detail below by using an exemplary embodiment and with reference to the drawing, in which.

Figure 1:
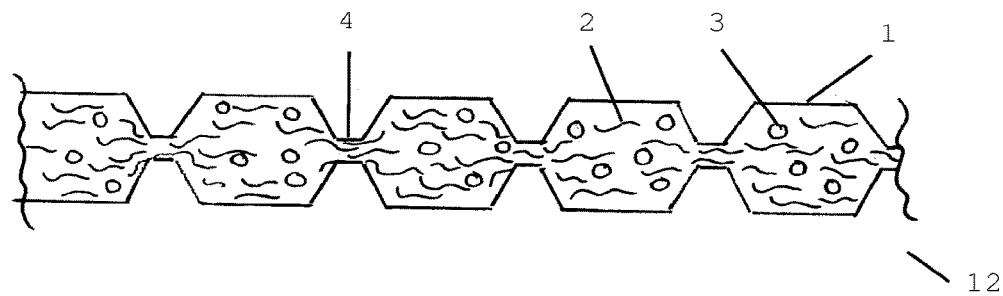
FIG. 1 shows a greatly enlarged partial section through the element.

FIG. 1 shows a partial section through the moisture-regulating element 12 according to the invention. This element has a layer 1 which has a high proportion of pulp fibres 2, in which moisture-binding means 3 are incorporated. The layer 1 forms the core of the element 12.

The pulp fibres 2 are compacted in the embossed areas 4 and in this way are connected to one another. In the embodiment illustrated here, the embossed areas 4 are located opposite one another on the upper and lower side, so that in the respective embossed area 4 only a narrow web of interconnected pulp mass remains. The other areas of the layer 1, arranged between the respective embossed areas 4, exhibit looser pulp layering. An intimate connection between the pulp fibres 2 does not exist in these areas.

The adsorption behaviour and the retention capacity of moisture is determined by the layer 1 made of pulp fibres 2 and the moisture-binding means 3 used and, if appropriate, further materials which can be incorporated in the layer 1. In the embodiment illustrated here, the layer 1 in the embossed areas 4 has the shape of truncated pyramids or truncated cones; the angle of the slopes formed should preferably lie between 10° and 45°.

Bulk material that is presently available inexpensively can be used as pulp material for the fibrous web 1. Use is preferably made of what is known as fluff-pulp, which is distinguished by a very good binding behaviour, which improves the mechanical strength of the element with respect to vertical tensile forces.

During the production of the element according to the invention, first of all a web material is produced, which is then cut to the desired size. For the production of the web material in a continuous process, the fibrous web later forming the layer 1 is produced from a loose filling of fibres 2 loosened in the air stream and made of defibered pulp (wood pulp) and the moisture-binding means 3 and, if appropriate, further incorporated materials. For the production of a standardized, defiberized product, recourse can be had to renewable wood raw materials available on the market.

The loose pulp filling process as a starting product for the layer 1 permits dry processing of the pulp fibres 2 and therefore, during the subsequent embossing of the multilayer web between two structured rolls, very good compaction of the pulp fibres in the discrete embossed areas 4. Outside these embossed areas 4, the fibres lie loosely on one another, which influences the behaviour of the incorporated moisture-binding means to the effect that the moisture does not impair the predefined binding capability according to the binding capacity (hygroscopicity), moreover, as a result of the loose layering of the fibres between the respective embossed areas, the flexibility of the element 1 is improved and, when the element 1 is used in packaging, it serves simultaneously as a protection against shocks, etc. for the product to be packaged. The element according to the invention can be used as an inlay in foodstuffs packaging, for example for convenience products, bread, sausage products including meatballs.

The production of the element according to the invention is carried out preferable from web material, which is fabricated in a continuous process. In air-assisted layering, firstly the pulp fibres 2 and the means 3 able to bind moisture and, if appropriate, further additives for binding the layer 1 are laid. Then, the production of the embossed areas 4 is carried out in a calender having two structured calender rolls. A possible production method is disclosed, for example, in European Patent 1 032 342.

Depending on how thick the finished web is intended to be, it is also possible to lay a plurality of layers made of pulp fibres 2 and means 3 and, if appropriate, further additives over one another and then to introduce them into the calender in order to obtain the embossed areas 4. In this way, the moisture-binding means is incorporated layer by layer in the web. A homogenous distribution is achieved if the moisture-binding means are processed together with the pulp fibres, that is to say distributed uniformly in the pulp fibres, to form web material.

Figure 2:
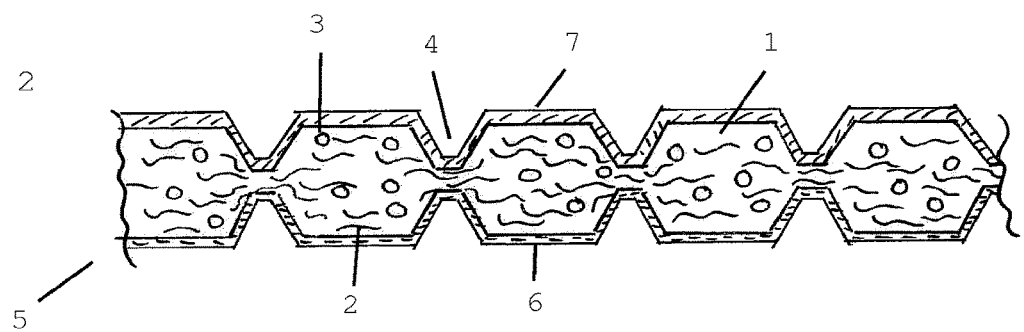
FIG. 2 shows a greatly enlarged partial section through a multilayer element.

A multilayer web 5, as illustrated in FIG. 2, can be produced, for example, by a covering layer 6 or a base layer 7 being used first as a carrier layer. The loose filling of pulp fibres 2 and the moisture-binding means 3 is then applied to this carrier layer 6 or 7 in the air stream. This arrangement made of carrier layer and loose filling is then led jointly through the structured rolls of the calender. Alternatively, the other of the two layers 6, 7, which is therefore not already a carrier layer, can also be laid on the pulp layer 1 previously, that is to say before the final leading through the calender.

The two layers 6 and 7 can also be applied subsequently, if appropriate with further layers, in a manner known per se. If the further layers are applied subsequently, they can have any desired surface structure, for example be smooth.

The embodiment illustrated in FIG. 2 shows a total of 3 layers, specifically a web assembled from the layers 6, 1 and 7.

The lowest layer is used as a base material and a layer is applied as an upper layer. The covering layer 6 has the advantage that the product to be packaged does not come directly into contact with the pulp fibres and the means adsorbing the liquid or moisture-regulating means, resp.

Suitable as a base material and also as a covering layer 6 are, in particular, those materials through which the water vapour can pass but which are impermeable to the moisture-binding/-regulating means incorporated. Examples of suitable materials are nonwoven-like materials and tissue based on plastic or cellulose.

The edges 14 of the element may be open or closed.

Figure 3:
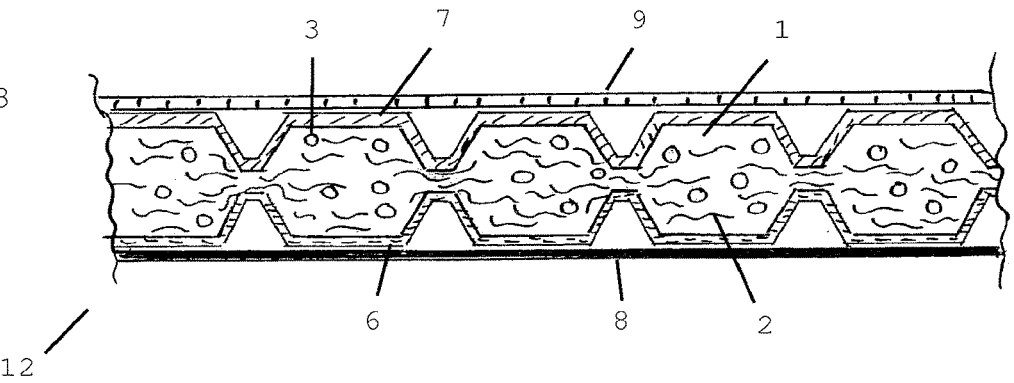
FIG. 3 shows a greatly enlarged section through a further multilayer element.

FIG. 3 shows an element according to the invention which has the same structure as the element from FIG. 2 but is surrounded by further layers 8 and 9. These further layers 8 and 9 can be larger than the layer 1 and/or the layers 6 and 7 possibly arranged thereon. The layers 8 and 9 can be the same or different and are used to match the properties of the element to the specific requirements of the products to be stored. These further layers can be connected to one another without the layer 1 and the layers 6 and 7 possibly arranged thereon also being gripped. These two layers form a sheath for the element. They can be made of textile, nonwoven-like or film-like material or tissue; at least one layer of such a sheath should be permeable to the moisture. The layers 8 and 9 are preferably chosen from cotton, nonwoven and/or perforated film.

In a possible embodiment one of the further layers 8 or 9 is impermeable for moisture. In such embodiment the layer 9 directed to the product may be permeable for moisture/liquid and the layer 8 directed to the package is liquid-impermeable. This embodiment prevents that liquid passes from the bottom of the package back to the product in case the capacity of the inventive element 12 is exceeded and due to the weight of the product 12 the liquid is squeezed out of the element 12 and collected at the bottom of package.

Figure 4:
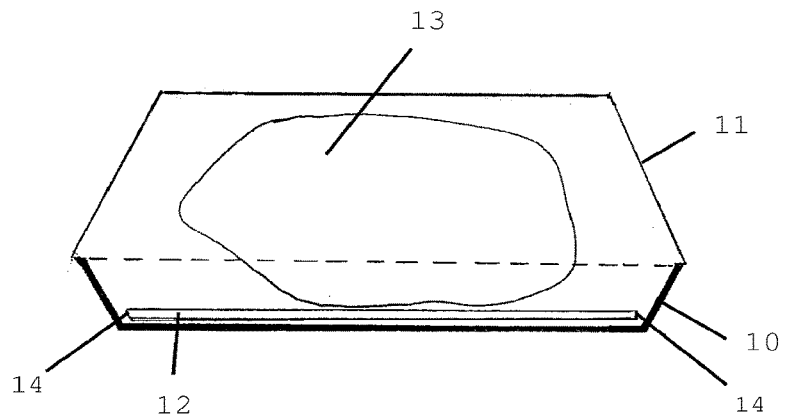
FIG. 4 shows a partial section through a packaging.

FIG. 4 shows a foodstuffs packaging comprising lower shell 10 and lid 11, into which an element 12 according to the invention has been inserted. The stored product 13 is laid on the element 12 and the packaging is closed by the lid 11.

A packaging illustrated in FIG. 4 was used to investigate the influence of the element according to the invention on the shelf life of stored foodstuffs. To this end, the element according to the invention was inserted into a packaging; for the purpose of comparison an element with an identical structure but without moisture-binding means was inserted. Different foodstuffs were stored in this packaging over a number of days; the visual appearance of these foodstuffs was compared.

| Stored foodstuff | Storage period (days) | Visual appearance According to the invention | Comparison |
| --- | --- | --- | --- |
| Rolls | 12 | Slightly shrunk | Clear signs of mould |
| Rolls | 17 | Dry | Completely affected by mould |
| Toast | 12 | Unchanged | Slight mould spots |
| Toast | 6 | Dry and hard | Completely surrounded by mould |
| Fresh cheese | 15 | No condensation | Considerable amounts of condensation |
| Hard cheese | 15 | No condensation | Considerable amounts of condensation |
| Sandwich | 2 | No condensation, bread not soggy | Bread very damp and soggy |

As the above illustration makes clear, the shelf life of foodstuffs could be improved considerably.

The reduction in moisture and condensation not only leads to a prolongation of the shelf life, in addition the sensory impression of the foodstuffs is considerably better. Not only the appearance of the products but the storage after some days was still very good as compared with the conventionally stored foodstuffs, in addition the tactile properties were very much better, for example the bread which was used for the sandwiches was not soggy, as compared with the conventionally stored product.

In the case of fresh cheese, hard cheese, a considerable improvement in the visual properties can be observed. In the case of these products, only the sensory change was studied; a prolongation of the shelf life whilst maintaining optimal visual properties is also possible.

For ease of reference the following list of reference symbols is provided.
1 Layer
2 Pulp fibres 3 Moisture-binding means
4 Embossed area
5 Multilayer web
6 Covering layer
7 Base layer
8, 9 Further layer
10 Lower shell
11 Lid
12 Element according to the invention
13 Stored product
14 Edge

The invention claimed is:

1. A method comprising regulating the moisture level in a package comprising using a moisture regulating element in the package to draw moisture from the air in the package and give up moisture to the air in the package to regulate the moisture level in the package, the moisture regulating element comprising a plurality of layers of pulp fibres characterized in that the moisture regulating element is configured with a base layer arranged above or below a first layer of pulp fibres and with a cover layer arranged on a side opposite the base layer, wherein the base layer and the cover layer are same or different and each is a nonwoven or tissue, and wherein an additional layer is arranged on the base layer or the cover layer and comprises one of cotton, a nonwoven or perforated film, and the plurality of layers of pulp fibres is substantially built up from a loose filling of pulp fibres loosened in an air stream to provide a plurality of first areas of pulp fibres comprising loose, airlaid pulp fibers and plurality of second areas comprising compacted, airlaid pulp fibers connected to one another in an adhesive free or binder free manner, in which one of the plurality of second areas is present between and connects the plurality of first areas, wherein the layer further comprises solid material incorporated during laying of the pulp fibers and disposed on the pulp fibers of the first areas and the second areas, in which each of the disposed solid material and the pulp fibers of the first areas and the second areas are positioned in the layer to adsorb and to release moisture to the air in the package or draw moisture from the air in the package to regulate moisture content in the package comprising the moisture regulating element, wherein the disposed solid material is layered between layers of the built up pulp fibres, and wherein the solid material present on the pulp fibres in each of the first areas and the second areas to regulate the moisture content is a sugar.

2. The method of claim 1, wherein the sugar comprises fructose.

3. The method of claim 1, further comprising pressing the airlaid pulp fibers using pressure and heat to provide the pressed areas.

4. The method of claim 1, wherein the sugar comprises glucose.

5. The method of claim 1, wherein the sugar comprises saccharose.

* * * * *